(12) United States Patent
Baudasse

(10) Patent No.: US 8,468,902 B2
(45) Date of Patent: Jun. 25, 2013

(54) REUSABLE DEVICE FOR HOLDING AT LEAST ONE MOVING OBJECT SECURELY AUTONOMOUSLY AND WITHOUT SHOCKS, FOR SPACECRAFT

(75) Inventor: Yannick Baudasse, Grasse (FR)

(73) Assignee: Thales, Beuilly-sur-Seine (FR)

( * ) Notice: Subject to any disclaimer, the term of this patent is extended or adjusted under 35 U.S.C. 154(b) by 745 days.

(21) Appl. No.: 12/479,134

(22) Filed: Jun. 5, 2009

(65) Prior Publication Data

US 2009/0301236 A1    Dec. 10, 2009

(30) Foreign Application Priority Data

Jun. 6, 2008   (FR) ...................................... 08 03166

(51) Int. Cl.
*G01C 19/24* (2006.01)

(52) U.S. Cl.
USPC ............................................................. 74/5.1

(58) Field of Classification Search
USPC ...... 74/5.1, 5.12, 5.34, 5.37, 5.7, 5 F; 269/43, 269/45, 246, 249, 254 CS
See application file for complete search history.

(56) References Cited

U.S. PATENT DOCUMENTS

| | | | | |
|---|---|---|---|---|
| 2,815,961 A * | 12/1957 | Brueder | ................. | 280/124.143 |
| 3,205,719 A * | 9/1965 | Conroy | ................. | 74/5.41 |
| 3,576,298 A * | 4/1971 | Barnett et al. | ............. | 244/159.3 |
| 4,872,357 A * | 10/1989 | Vaillant De Guelis et al. | .. | 74/5.1 |
| 6,006,871 A * | 12/1999 | Leconte et al. | ............. | 188/72.4 |
| 7,197,958 B2 | 4/2007 | Brault et al. | | |
| 7,798,459 B2 * | 9/2010 | Dickson | ................. | 248/316.3 |

FOREIGN PATENT DOCUMENTS

| | | |
|---|---|---|
| EP | 0 614 807 A1 | 9/1994 |
| EP | 0 729 885 A1 | 9/1996 |

\* cited by examiner

*Primary Examiner* — Troy Chambers
*Assistant Examiner* — Michael Gonzalez
(74) *Attorney, Agent, or Firm* — Baker & Hostetler LLP

(57) ABSTRACT

The present invention relates to a reusable device for securely holding at least one fragile object against a functional surface solidly fixed to the structure of a satellite or spacecraft during at least one operational phase relating to this satellite, making the objects thus held more accessible and intervention on these objects easier, while at the same time preventing damage to these objects under the effect of sudden accelerations, both during this (these) operational phase(s) and while the hold is being established or while the hold is being released. The device according to the invention is characterized in that it comprises a rigid structure which partially grips this (these) object(s) and which supports at least one fixed jaw and at least one moving jaw substantially facing the fixed jaw(s), the object being immobilized between the fixed jaw and the moving jaw throughout the period of firm holding.

15 Claims, 2 Drawing Sheets

REUSABLE DEVICE FOR HOLDING AT LEAST ONE MOVING OBJECT SECURELY AUTONOMOUSLY AND WITHOUT SHOCKS, FOR SPACECRAFT

CROSS-REFERENCE TO RELATED APPLICATIONS

This application claims priority of French application no. FR 0803166, filed Jun. 6, 2006, the disclosure of which is hereby incorporated by reference in its entirety.

BACKGROUND OF THE INVENTION

The present invention relates to a reusable device for securely holding at least one object during at least one operational phase of use of this (these) object(s).

Some equipment used on board satellites and spacecraft is fragile (for example instruments such as optical instruments, gyroscopes, deployable antennas, etc.) and runs the risk of being damaged during the launch during which the satellites are subjected to shocks or very high accelerations.

In order to prevent such damage, systems known as stacking systems are generally employed, these immobilizing this equipment against a functional surface firmly fixed to the structure of the satellite. Certain satellite internal arrangements prevent or complicate access to the stacking systems (for example after "ground" trials). This access is needed, because most present-day stacking systems employ either fusible components or elements that can be retracted (or repackaged and require intervention). As a result, once destacked, these systems do not allow automatically repackaging for future use. In addition, numerous instruments that have to be stacked, or surrounding subassemblies, are often sensitive to the shocks produced by the pyrotechnic destacking components.

At the present time, the proposed systems for releasing the stacking ties essentially comprise systems based on the tensioning (pulling) of a tie rod. Release of the tie rod causes the object that is to be stacked to separate from the functional surface. The repackaging of this type of stacking, with a view to reuse during the same flight, entails human intervention.

SUMMARY OF THE INVENTION

The subject of the present invention is a reusable device for securely holding at least one fragile object against a functional surface solidly fixed to the structure of the satellite during at least one operational phase relating to this satellite, making the objects thus held more accessible and intervention on these objects easier, while at the same time preventing damage to these objects under the effect of sudden accelerations, both during this (these) operational phase(s) and while the hold is being established or while the hold is being released.

The device according to the invention is characterized in that it comprises a rigid structure which partially grips this (these) object(s) and which supports at least one fixed jaw and one moving jaw substantially facing the fixed jaw(s), the object being immobilized between the fixed jaw and the moving jaw throughout the period of secure holding.

According to another feature of the invention, in the case of objects comprising at least one element that has at least one degree of freedom when not held and is sensitive to accelerations, pressing against the fixed jaw is obtained by crushing at least one elastic element positioned between said element and a fixed part of the rigid structure. This elastic element may be mechanical, magnetic, hydraulic or pneumatic.

BRIEF DESCRIPTION OF DRAWINGS

The present invention will be better understood upon reading the detailed description of one embodiment, taken by way of nonlimiting example, and illustrated by the attached drawing, in which.

DETAILED DESCRIPTION

The invention is described hereinbelow with reference to a gyroscopic actuator (detailed in FIGS. 3 and 4), but it must be clearly understood that the invention is not restricted to this application and that it can be implemented to protect all kinds of equipment comprising at least one part that is fragile to the effects of sudden and strong accelerations (mechanical and mechanical-thermal stresses) during at least one phase of their life, whether on board satellites or other types of space vehicle, or alternatively equipment positioned on any supports, these parts being of the type having at least one element that is normally mobile with at least one degree of freedom, these elements, or their connections with the equipment comprising them, needing to be protected during at least one phase of their life.

Figure 1:
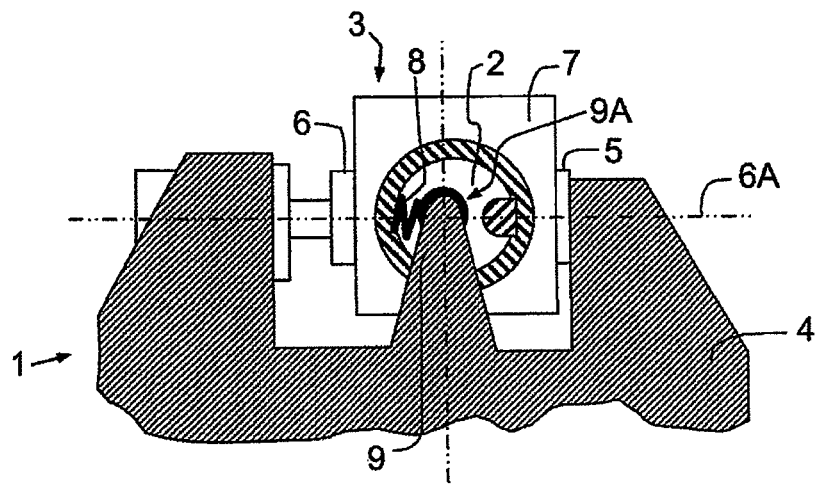
FIGS. 1 and 2 are simplified side views of a device for implementing the method of the invention, in the state of holding and the state of not holding a fragile moving part, respectively.
Figure 2:
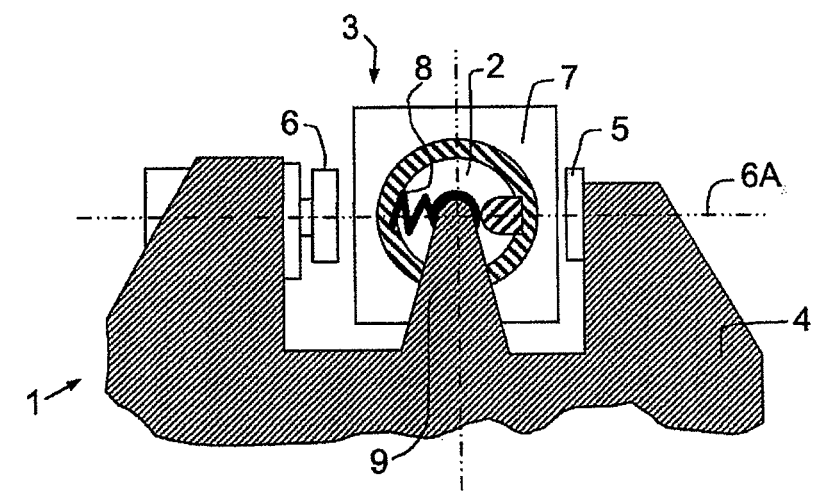

According to an alternative form of the invention, in the event that the moving part that has to be protected does not collaborate with an elastic device such as the spring depicted in FIGS. 1 and 2, and is therefore incapable of translational movement with respect to the fixed part surrounding it and therefore of being immobilized against it, use is made, in addition to the linear actuator that immobilizes the fixed part, for example another device with two actuators immobilizing the moving part in the manner of a clamping jaw, and therefore two jaws opposite one another in order to grip the component (if it is rigid in the direction of movement).

FIGS. 1 and 2 schematically depict a device 1 according to the invention for securely holding fragile parts 2 and 7 of a rotationally mobile object 3. The fragility of the part 2 lies more particularly along its axes of rotation and the bearing that allow this rotation, whereas the fragility of the part 7 lies more particularly in the payload itself. This device 1 essentially comprises a rigid frame 4 in the overall shape of a U and equipped with a fixed jaw (or end stop ) 5 and a moving jaw 6, in the manner of a vise. Of course, if the object 3 had a complex exterior shape rather than having a flat face as depicted in the drawing, the fixed jaw would have a bearing surface shaped accordingly. The axis 6A is the axis of movement of the moving jaw. Of course, the shape of the frame and the dimensions thereof are tailored to suit the object 3.

To implement this device 1, either the frame 4 can be fixed to a rigid structure (not depicted), as is the case for the frame depicted in FIGS. 1 and 2, or use may be made of an automated mechanism (not depicted) that moves the frame 4 and/or the object 3 toward one another so that they occupy the positions depicted in these figures when there is a need for the fragile part to be held securely.

The object 3 essentially comprises a body 7 comprising a circular recess supporting the fragile guidance component 2. In general, this part 2 allows the object 3 some mobility in rotation and/or in translation once the secure hold has been released. In this example, the moving part 2 is a rotor rotating about an axis coincident with the axis 6A.

In normal operation of the object 3, the part 2 occupies, with respect to the body 7, the position depicted in FIG. 2, that is to say that it is centered with respect to the circular recess of the body 7. Furthermore, this part 2 is held in this centered position by an elastic or flexible device 8 secured to the guidance device 2 on one side and, on the other side, to the frame 4 via the arm 9. This elastic device may, with equal preference, be a mechanical device (a spring, a block of elastic material such as an elastomer, a hydraulic or pneumatic device, etc.) as it may a non-mechanical device (using magnetic or electromagnetic repulsion, etc.). The device 8, in the operational position, applies enough load to "counter" the environmental forces (accelerations, orbital torques, etc.) to which the object 3 may be subjected once released. This then makes the connection very stiff as long as no load in excess of the preload of the device 8 is applied.

The strength of the moving jaw 5 is, of course, at least enough to be able to compress the device 8 and to keep it compressed while withstanding the accelerations to which the object 3 may be subjected. The purpose of this elastic device is to allow, on the one hand, to allow normal operation of the fragile moving parts and, on the other hand, to couple the fragile connections to the fixed parts fairly rigidly to prevent them from moving in any way that might damaging them. Of course, in the alternative form mentioned hereinabove, with two moving jaws, this element 8 need not exist.

Figure 3:
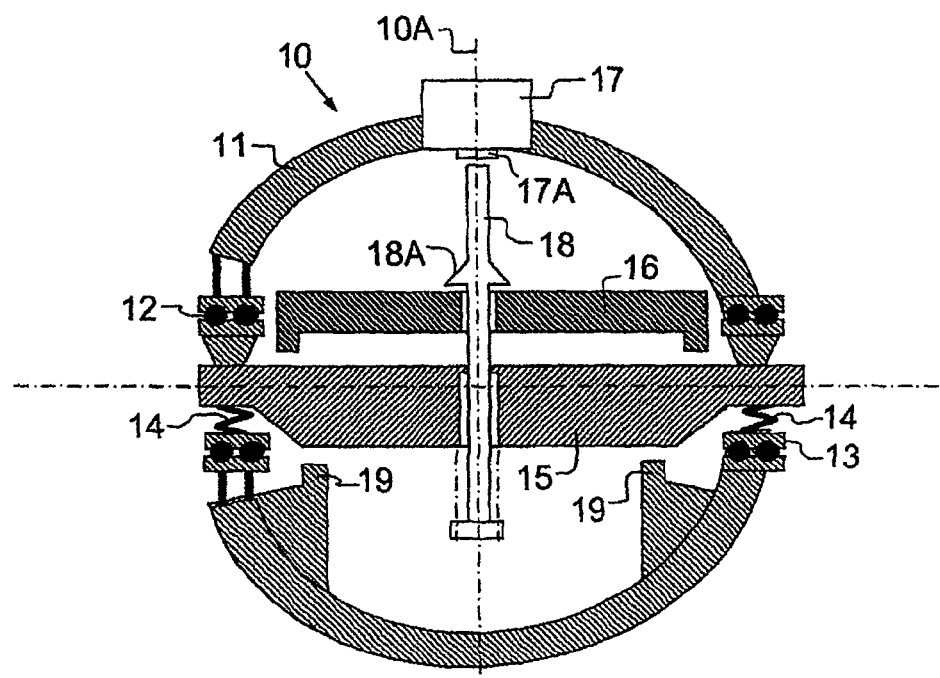
FIGS. 3 and 4 are section views of one example of an application of the device according to the present invention, in the non-stacked condition and the stacked condition of a gyroscopic actuator intended for a satellite, respectively.
Figure 4:
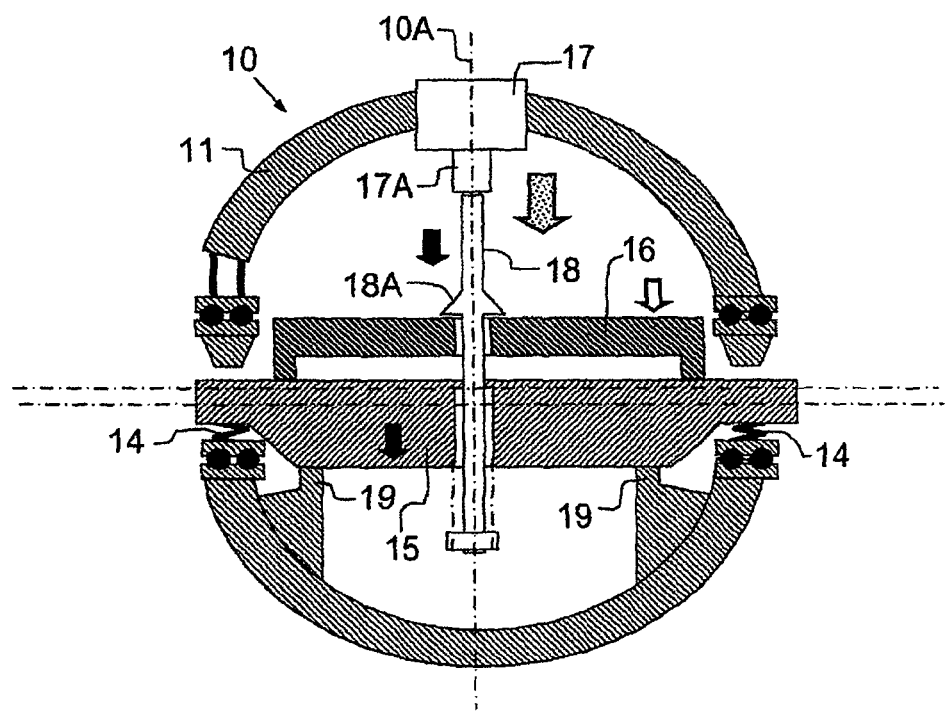

To protect this part 2 and the part 7 (the fragile payload to be held, comprising optical instruments, the magnet wheel, etc.), the invention anticipates, when establishing the firm hold, disconnecting the part 2 from an end stop 9A formed on the arm 9 which is connected to the frame 4. This end stop 9A is not depicted in detail in FIGS. 1 and 2, but one possible example thereof is illustrated in FIGS. 3 and 4.

In the case depicted, just one object is positioned between the jaws 5 and 6, but it is obvious that several objects could be positioned side by side if they are similar and if they can be positioned in this way, and this can be done by providing a corresponding number of end stops such as the end stop 9A.

When, (by remote control, on a timer, or using an acceleration-detecting automated system, for example) a firm hold on the part 2 is commanded, this command causes the moving jaw 6 (for example a piston of a linear actuator) to advance toward the fixed jaw 5, and as this moving jaw advances, it comes into contact with the object 3 then pushes this object toward the fixed jaw. During this movement, the part 2 is no longer in contact with the end stop 9A of the arm 9, the elastic device 8 is compressed until the object 3 comes into contact with the mechanical end stop 5.

The process for commanding an end to the secure hold (the release process) is the reverse: Retraction of the moving jaw 6 gradually releases the device 8, the part 2 then returns to its normal position with respect to the arm 9 (it comes back into contact with the end stop 9A) and this body 7 is freed of any contact with the jaws 5 and then 6.

FIGS. 3 and 4, by way of nonlimiting example, depict the application of the invention to a gyroscopic actuator 10 equipped with a magnetic bearing wheel. In this example, as the satellite comprising this gyroscopic actuator is launched, it is necessary simultaneously to stack two subassemblies: The rotor of the wheel and the wheel subassemblies on the frame. The purpose of this stacking is to maintain the integrity of the parts with which each subassembly is fitted, typically the rotor of the wheel fitted with magnets that are very fragile and sensitive to shock and the guidance, drive and servo control components (not depicted).

The gyroscopic actuator 10 is of a double gimbal type with magnetic gyrospinner bearings (for rotor and stator), this gyrospinner being made to rotate in its entirety by a motor (not depicted) secured to the shell 11, about an axis orthogonal to the axis of rotation of the rotor thereof. In this example, the wheel of this actuator is guided with magnetic bearings, but the axis orthogonal to the wheel (the axis of the actuator) is guided with ball bearings. Because this gyroscopic actuator is well known per se, it will be only briefly described here. It comprises an outer shell 11 of annular overall shape supporting diametrically opposed annular rolling bearings 12, 13. The bearings 12, 13 bear elastic elements, which in this instance are springs 14, secured to the shaft of the stator 15 and pressing the latter against the opposite face of these same bearings the plane of which is orthogonal to the axis 10A of the gyrospinner. The springs 14 support a stator 15 substantially having the shape of a circular plate. In the non-stacked state, the springs 14 press the stator 15 against the bearings 12 and 13. The gyrospinner further comprises a rotor 16, substantially in the form of a circular plate, fitted with magnets that are fragile and sensitive to shocks and able to move in terms of rotation about the axis 10A. The rotor 16, in normal operation, is a short distance (a few millimeters) away from the stator 15.

The stacking device according to the invention essentially comprises a linear actuator 17 and a transmission element 18 in the form of a curve transmitting the axial force from the actuator to the rotor 16, and which butts against fixed lateral end stops 19 in the way described hereinbelow. The actuator 17 is fixed to the shell 10 in such a way that its pushrod 17A moves along the axis 10A. The stroke of this pushrod is relatively short: just a few millimeters, and it develops a thrust force of about 15 to 20 kN. The element 18 is capable of translational movement and guided coaxially with respect to the axis 10A by the stator 15, and without contact passes through a central opening 16A in the rotor. This element 18 comprises a mechanical end stop in the form of a shoulder 18A formed on its part located between the rotor 16 and the actuator 17, so that in the non-stacked position it lies close to the stator without coming into contact therewith.

FIG. 4 depicts the gyroscopic actuator 10 in the stacked position. In order to reach this position, the actuator 17 is remotely controlled and its pushrod 17A pushes the element 18 toward the rotor 16, this having the effect of pressing the shoulder 18A against the rotor 16 which comes into contact with the stator 15, and then the rotor 16 pushes back the stator, compressing the springs 14 until the face of the stator opposite the rotor comes into contact with fixed stops 19 formed on the shell 11. Of course, these stops 19 are arranged in such a way that when the stator 15 comes into contact with them, the springs 14 are normally compressed (without being excessively crushed) and that the stroke of the pushrod 17A is just sufficient to obtain this normal compression. Of course the actuator 17 and its control are also designed to maintain the stacking for as long as necessary, without a continuous supply of current. This then simultaneously immobilizes the rotor of the wheel against the stator and the stator against the outer shell. During destacking, an appropriate remote control signal sent to the actuator 17 commands retraction of the pushrod 17A, the effect of this being to return the rod 18, the stator 15 and the rotor 16 to their original positions (those depicted in FIG. 3).

This device requires no direct human intervention for stacking or destacking the assembly, it being possible for the actuator 17 to be controlled remotely in any appropriate way (the only constraint is that the rotor-stator subassembly be positioned along the line of thrust). When the satellite is being launched, the rolling bearings of the gyroscopic actuator are stressed only a little thanks to the action of the stacking which presses the stator and rotor assembly against the outer shell. This makes it possible to limit the preloads on the rolling bearings and therefore the associated resistive torques in the operational mode.

The device of the invention has the following advantages: it comprises only a stand-alone mechanism that requires no external intervention; it allows several objects to be stacked simultaneously, stacking is progressive and shock-free, and there is the possibility of restacking an object after use (test or flight), thus saving time and expense when it is industrialized.

The invention claimed is:

1. A holding device comprising:
   an object having a first element and a second element, the first element being free to move according to a first degree of freedom with respect to the second element;
   a rigid structure configured to partially surround the object and which supports a moving jaw, the second element being free to move according to a second degree of freedom with respect to the rigid structure; and
   at least one elastic element positioned between the second element and the rigid structure;
   wherein throughout a period of secure holding, movement in accordance with both the first degree of freedom and the second degree of freedom is simultaneously immobilized by the moving jaw pressing the first element against the second element, which forces the second element against a fixed part of the rigid structure while crushing the at least one elastic element.

2. A spacecraft, comprising a device according to claim 1.

3. A device according to claim 1, wherein said object is a gyroscopic actuator of the type with a rotor with a magnetic bearing and a stator, and wherin the moving jaw comprises an actuator pushrod having a mechanical end stop for pressing against the rotor throughout the period of secured holding and therefore pressing the rotor against the stator which is itself pressed against end stops formed on the rigid structure.

4. A spacecraft, comprising a device according to claim 3.

5. A device according to claim 1, wherein, with the elastic elements in an operational position, enough load is applied by the at least one elastic element against the object to counter the environmental forces to which the object may be subjected once released.

6. A spacecraft, comprising a device according to claim 5.

7. A device according to claim 1, wherein the elastic element is a hydraulic or pneumatic element.

8. A device according to claim 7, wherein, with the elastic elements in an operational position, enough load is applied by the at least one elastic element against the object to counter the environmental forces to which the object may be subjected once released.

9. A device according to claim 1, wherein the elastic element is a mechanical element.

10. A device according to claim 9, wherein, with the elastic elements in an operational position, enough load is applied by the at least one elastic element against the object to counter the environmental forces to which the object may be subjected once released.

11. A device according to claim 9, wherein the at least one elastic element is a hydraulic or pneumatic element.

12. A device according to claim 11, wherein, with the at least one elastic element in an operational position, enough load is applied by the at least one elastic element against the object to counter the environmental forces to which the object may be subjected once released.

13. A device according to claim 9, wherein the elastic element is an element with a leaf, a spring or a device made of an elastomeric material.

14. A device according to claim 13, wherein said object is a gyroscopic actuator, the first element being a rotor with a magnetic bearing and the second element being a stator, and wherein the moving jaw comprises an actuator pushrod having a mechanical end stop that presses against the rotor throughout the period of secured holding to force the rotor to press against the stator.

15. A device according to claim 13, wherein, with the at least one elastic element in an operational position, enough load is applied by the at least one elastic element against the object to counter environmental forces to which the object may be subjected once released.

* * * * *